US008508526B2

(12) United States Patent
Liou et al.

(10) Patent No.: US 8,508,526 B2
(45) Date of Patent: Aug. 13, 2013

(54) STEREO DISPLAY AND DISPLAY (75) Inventors: Jian-Chiun Liou, Kaohsiung County (TW); Kuen Lee, Hsinchu (TW); Jui-Feng Huang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 500 days.

(21) Appl. No.: 12/575,479

(22) Filed: Oct. 8, 2009

(65) Prior Publication Data
US 2010/0020062 A1 Jan. 28, 2010

Related U.S. Application Data (63) Continuation-in-part of application No. 11/672,521, filed on Feb. 8, 2007.

(30) Foreign Application Priority Data

Aug. 16, 2006 (TW) ................................ 95130046 A
Aug. 11, 2009 (TW) ................................ 98127025 A (51) Int. Cl.
*G06F 3/038* (2013.01)

(52) U.S. Cl.
USPC .................. 345/213; 345/6; 345/8; 345/102; 345/204; 348/54; 348/53; 353/7; 353/9; 359/462; 359/466

(58) Field of Classification Search
USPC ............. 345/6–9, 87, 98, 100, 102–103, 204, 345/213, 690; 349/15; 359/463–464, 466; 348/42, 51, 56–59, 53–54; 353/7–8
See application file for complete search history.

(56) References Cited

U.S. PATENT DOCUMENTS 6,348,916 B1  2/2002  Jeong et al.
6,727,867 B2  4/2004  Divelbiss et al.
(Continued)

FOREIGN PATENT DOCUMENTS

TW    200606503    2/2006
TW    200723197    6/2007
(Continued)

OTHER PUBLICATIONS

Liou et al., Shutter-Glasses Type 3D Display with Dynamic Backlight, Int'l Display Manufacturing Conference / 3D Systems and Applications / Asia Display 2009, Taipei Int'l Convention Center, Taiwan, Apr. 27-30, 2009.
"Office Action of Taiwan Counterpart Application", issued on Apr. 26, 2013, p1-p8, in which the listed references were cited.

*Primary Examiner* — Lun-Yi Lao
*Assistant Examiner* — Saiful A Siddiqui
(74) *Attorney, Agent, or Firm* — Jianq Chyun IP Office (57) ABSTRACT

A stereo display including a display panel unit, a shutter glasses unit, and a backlight unit is provided. The display panel unit sequentially displays a right eye image and a left eye image according to a right eye synchronizing vertical signal and a left eye synchronizing vertical signal. The shutter glasses unit has a right eye glass and a left eye glass, wherein the right eye glass is synchronously opened according to the right eye synchronizing vertical signal, and the left eye glass is synchronously opened according to the left eye synchronizing vertical signal. The backlight unit provides a light source to the display panel unit, wherein the backlight unit is synchronously turned on and off according to the right eye synchronizing vertical signal, and the backlight unit is also synchronously turned on and off according to the left eye synchronizing vertical signal.

14 Claims, 7 Drawing Sheets

(56) References Cited

U.S. PATENT DOCUMENTS

| | | | |
|---|---|---|---|
| 7,057,638 B1* | 6/2006 | Yuuki et al. | 348/51 |
| 7,289,539 B1 | 10/2007 | Mimberg | |
| 2002/0057241 A1* | 5/2002 | Oda et al. | 345/87 |
| 2004/0233527 A1* | 11/2004 | Palovuori | 359/464 |
| 2005/0128374 A1* | 6/2005 | Furukawa | 349/56 |
| 2006/0187179 A1* | 8/2006 | Karman et al. | 345/102 |

FOREIGN PATENT DOCUMENTS

| | | |
|---|---|---|
| TW | 200746791 | 12/2007 |
| TW | 200847115 | 12/2008 |
| TW | 200931065 | 7/2009 |

\* cited by examiner

STEREO DISPLAY AND DISPLAY

CROSS-REFERENCE TO RELATED APPLICATION

This application is a continuation-in-part of and claims priority benefits of U.S. application Ser. No. 11/672,521, filed on Feb. 8, 2007, which claims the priority benefit of Taiwan application serial no. 95130046, filed on Aug. 16, 2006. This application also claims the priority benefit of Taiwan application serial no. 98127025, filed on Aug. 11, 2009. The entirety of each of the above-mentioned patent applications is hereby incorporated by reference herein and made a part of this specification.

BACKGROUND OF THE INVENTION

1. Field of the Invention

The present invention generally relates to a stereo display, and more particularly, to a stereo display with shutter glasses.

2. Description of Related Art

In a conventional stereo display, images coming from different view angles are respectively directed into the left eye and the right eye so that a stereo image can be seen without using any special glasses. 12 or 16 images from different view angles can be displayed horizontally. Even though some general display methods come with the technique for displaying different images regarding respectively the left and the right eye, the problem is that the stereo display effect is lost once the eyes are deviated from the appointed positions.

Another stereo display comes with shutter glasses. When such a stereo display displays images, it categorizes the images into odd images and even images. If it is determined that the odd images are to be seen through the right eye, the left eye is blocked by the shutter glasses so that the images can only be seen through the right eye. After that, the even images are displayed and the right eye is blocked by the shutter glasses so that the images can only be seen through the left eye. Accordingly, a stereo image is displayed. However, such a stereo display cannot use a liquid crystal display (LCD) as its display screen because the response speed of the LCD is not fast enough. If a LCD with the low response speed is used as the display screen of a stereo display, discomfort will be brought to a user of the stereo display when the user views stereo images through the LCD.

SUMMARY OF THE INVENTION

The present invention provides a stereo display including a display panel unit, a shutter glasses unit, and a backlight unit. The display panel unit sequentially displays a right eye image and a left eye image according to a right eye synchronizing vertical signal and a left eye synchronizing vertical signal. The shutter glasses unit has a right eye glass and a left eye glass, wherein the right eye glass is synchronously opened according to the right eye synchronizing vertical signal, and the left eye glass is synchronously opened according to the left eye synchronizing vertical signal. The backlight unit provides a light source to the display panel unit, wherein the backlight unit is synchronously turned on and off according to the right eye synchronizing vertical signal and is also synchronously turned on and off according to the left eye synchronizing vertical signal.

The present invention further provides a display including a display panel unit and a backlight unit. The display panel unit displays an image according to a synchronizing vertical signal. The backlight unit provides a light source to the display panel unit, and the backlight unit is synchronously turned on and off according to the synchronizing vertical signal.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
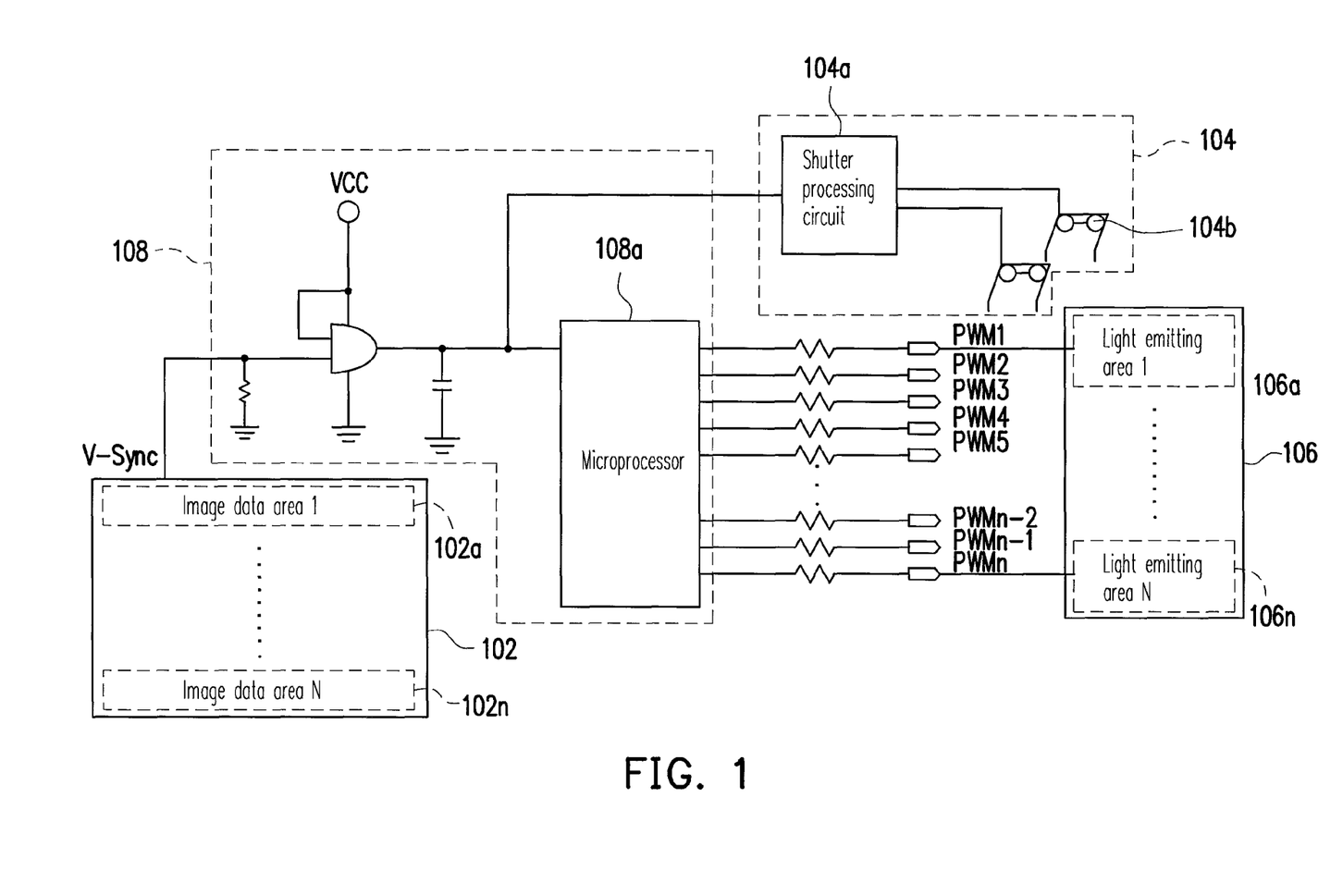
FIG. 1 is a block diagram of a stereo display according to an embodiment of the present invention.

FIG. 1 is a block diagram of a stereo display according to an embodiment of the present invention. Referring to FIG. 1, the stereo display in the present embodiment includes a display panel unit 102, a shutter glasses unit 104, and a backlight unit 106. In an exemplary embodiment, the stereo display further includes a control unit 108.

The display panel unit 102 includes a display panel and a driving circuit, wherein the driving circuit controls the display panel to display images. In the present embodiment, the display panel is a liquid crystal display (LCD) panel. Generally speaking, a LCD panel includes an active device array substrate, a color filter substrate, and a liquid crystal layer sandwiched between the two substrates. However, the display panel in the present invention is not limited to a LCD panel, and other non-self emissive display panels may also be applied to the stereo display provided by the present invention.

As described above, the active device array substrate has a plurality of scan lines, a plurality of data lines, and a plurality of pixel structures, wherein each of the scan lines and each of the data lines control the corresponding pixel structure, and the scan lines and the data lines are electrically connected to the driving circuit. The driving circuit transmits an image data signal to the pixel structures through the scan lines and the data lines, so as to display a specific image on the display panel. To be specific, a synchronizing vertical signal provided by the driving circuit is transmitted to the pixel structures through the data lines so that the display panel displays an image according to the synchronizing vertical signal provided by the driving circuit.

The display panel unit 102 in the present embodiment is applied to a stereo display. Thus, the display panel unit 102 displays a bi-optical stereo image through page-flipping typed display. A disparity exists between the left eye image and the right eye image, and when a viewer happens to see the left eye image through his left eye and the right eye image through his right eye, these left and right eye images with disparity produce a stereo vision with a certain depth in the viewer's brain. Accordingly, the display panel unit 102 sequentially displays a right eye image and a left eye image according to a right eye synchronizing vertical signal and a left eye synchronizing vertical signal so that the viewer can see a stereo image through a pair of shutter glasses. Below, the shutter glasses will be described in detail.

The shutter glasses unit 104 includes a pair of shutter glasses 104a and a shutter processing circuit 104b. The shutter glasses 104a are worn by the viewer, and which has a right eye glass and a left eye glass. The shutter processing circuit 104b controls the open and close of the shutter glasses 104a. Generally speaking, the right eye glass of the shutter glasses 104a is synchronously opened according to the right eye synchronizing vertical signal of the display panel unit 102, and the left eye glass of the shutter glasses 104a is synchronously opened according to the left eye synchronizing vertical signal of the display panel unit 102. To be specific, when the display panel unit 102 displays the right eye image according to the right eye synchronizing vertical signal, the shutter processing circuit 104b synchronously controls the right eye glass of the shutter glasses 104a to stay in an open state and the left eye glass thereof in a closed state, so that the viewer can only see the right eye image displayed on the display panel unit 102 through his right eye. Similarly, when the display panel unit 102 displays the left eye image according to the left eye synchronizing vertical signal, the shutter processing circuit 104b synchronously controls the left eye glass of the shutter glasses 104a to stay in an open state and the right eye glass in a closed state, so that the viewer can only see the left eye image displayed on the display panel unit 102 through his left eye. Generally speaking, the frequency of opening/closing the left and right eye glasses should be at least 60 times per second to make it comfortable enough for the viewer.

Since the open/close frequency of the left and right eye glasses of the shutter glasses 104a is above 60 times per second, the display panel unit 102 should output at least 120 images per second. Taking that the open/close frequency of the left and right eye glasses of the shutter glasses 104a is 60 times per second as an example, the display panel unit 102 outputs 120 images per second, wherein 60 images are seen through the right eye and another 60 images are seen through the left eye. However, because the display panel unit 102 (a LCD panel) comes with physical delay, when it switches from the left eye image to the right eye image, the right eye image still contains the residual image of the left eye image, and when it switches from the right eye image to the left eye image, the left eye image still contains the residual image of the right eye image. As a result, discomfort is brought to the viewer. In the present invention, this problem is resolved through the control over the backlight unit 106. Below, the backlight unit 106 will be described in detail.

The backlight unit 106 provides a light source to the display panel unit 102. Generally speaking, the backlight unit 106 is disposed behind the display panel unit 102, and the backlight unit 106 includes a backlight device and a backlight driving circuit for driving the backlight device to emit lights. The backlight device may be a direct-type backlight module or a side-type backlight module, and the light emitting body adopted by the backlight device may be a light emitting diode (LED), a lighting tube, or other suitable light emitting bodies. In the present embodiment, the backlight unit 106 is synchronously turned on and off according to the synchronizing vertical signals of the display panel unit 102. To be specific, the backlight unit 106 is synchronously turned on and off according to the right eye synchronizing vertical signal of the display panel unit 102 and is also synchronously turned on and off according to the left eye synchronizing vertical signal of the display panel unit 102. Thus, the backlight unit 106 is repeatedly turned on and off (and accordingly presents bright, dark, bright, and dark statuses) during the operation or display period of the stereo display. Namely, the backlight unit 106 does not remain in the turned-on state or present the bright status during the operation or display period of the stereo display.

Figure 2:
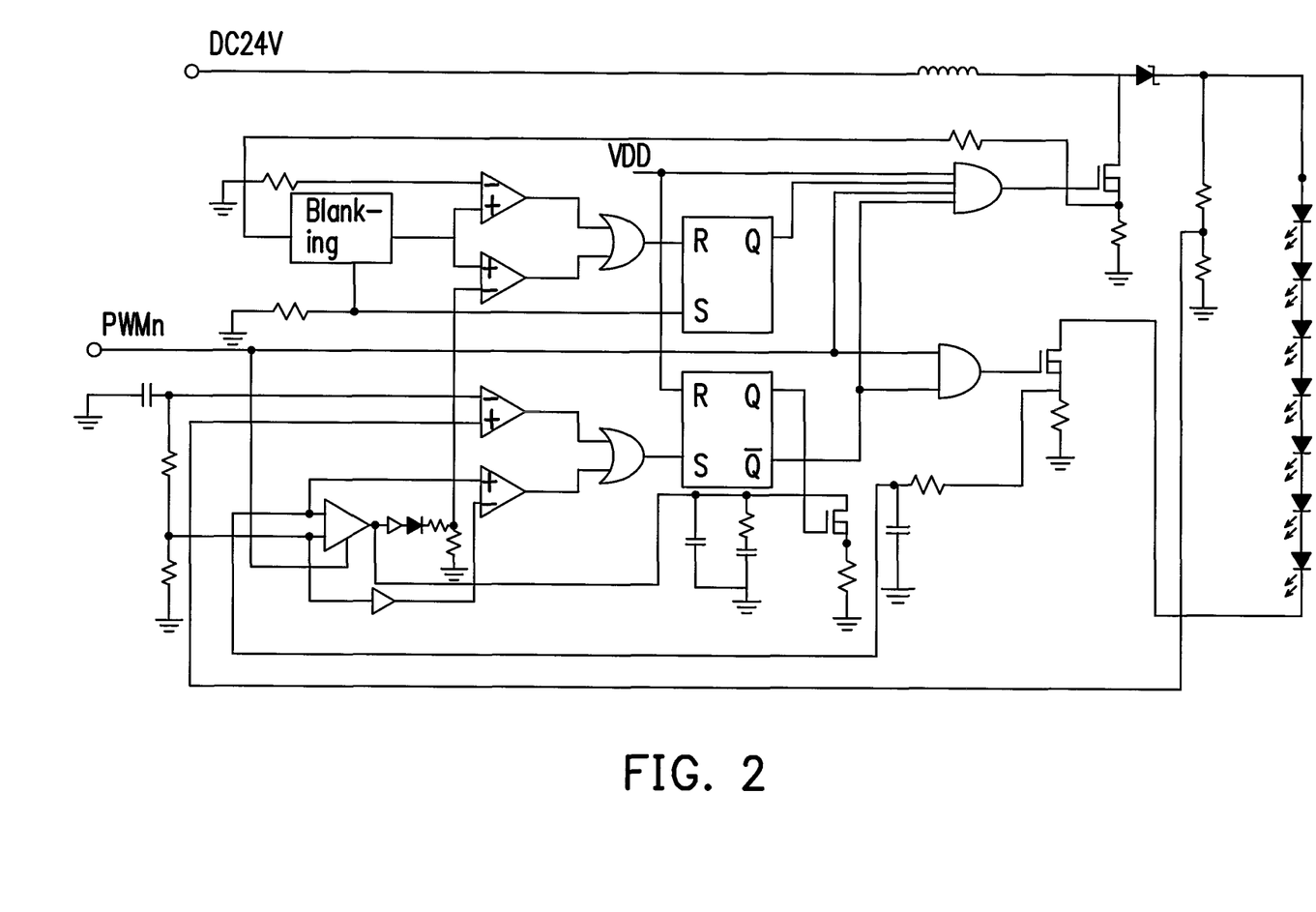
FIG. 2 is an equivalent circuit diagram of a light emitting area of a backlight unit according to an embodiment of the present invention.

In addition, the control unit 108 is electrically connected to the display panel unit 102, the shutter glasses unit 104, and the backlight unit 106. The control unit 108 includes a circuit for receiving and detecting a synchronizing vertical signal V-Sync and a microprocessor 108a. When the microprocessor 108a receives the synchronizing vertical signal V-Sync from the display panel unit 102, the microprocessor 108a performs various logical processes and counting calculations to divide the display panel unit 102 into N image data areas 102a~102n and the backlight unit 106 into N light emitting areas 106a~106n. In an embodiment, each of the light emitting areas 106a~106n of the backlight unit 106 may have a circuit design as illustrated in FIG. 2. However, the present invention is not limited thereto, and in other embodiments, each of the light emitting areas 106a~106n may also have other different circuit designs.

Generally speaking, an image displayed by the display panel unit 102 is filled up from top to bottom (i.e., from the first image data area 102a to the $N^{th}$ image data area 102n). The backlight unit 106 is divided into the N light emitting areas 106a~106n according to the N image data areas 102a~102n of the display panel unit 102, and the N light emitting areas 106a~106n are synchronized with the image data areas 102a~102n to turn on from top to bottom.

As described above, the backlight unit 106 is synchronously turned on and off according to the right eye synchronizing vertical signal of the display panel unit 102 and is also synchronously turned on and off according to the left eye synchronizing vertical signal of the display panel unit 102, and which may be implemented through following first to third embodiments.

It should be mentioned that according to another embodiment of the present invention, if the shutter glasses unit 104 is removed from the stereo display, the display structure then includes a display panel unit 102 and a backlight unit 106. In this display, the display panel unit 102 displays an image according to a synchronizing vertical signal, the backlight unit 106 provides a light source to the display panel unit 102, and the backlight unit is synchronously turned on and off according to the synchronizing vertical signal. In other words, the operations of the display panel unit 102 and the backlight unit 106 in the present display are the same as or similar to the operations of the display panel unit 102 and the backlight unit 106 in the stereo display described above.

First Embodiment

Figure 3:
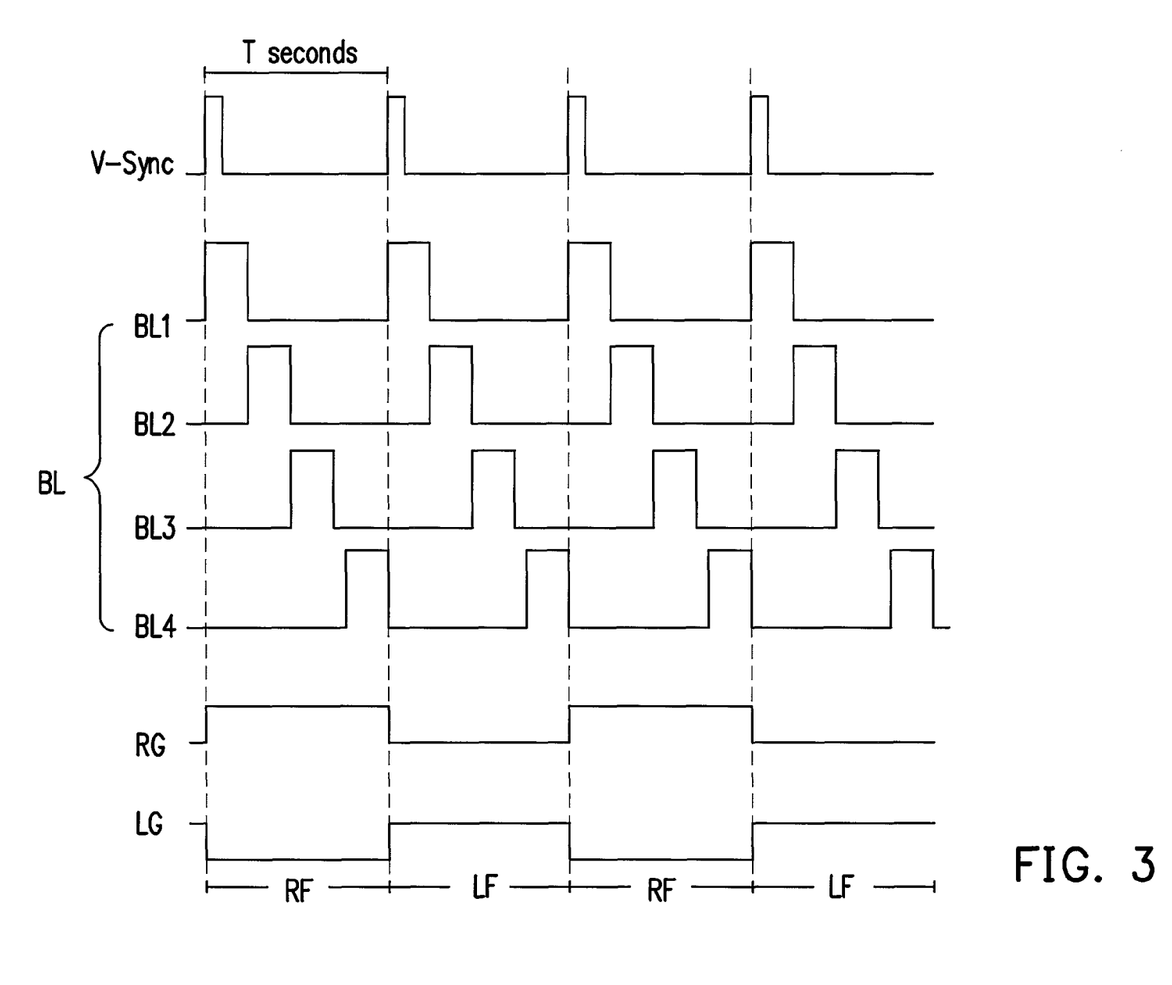
FIG. 3 is a diagram illustrating the driving clock of a stereo display according to an embodiment of the present invention.
Figure 4:
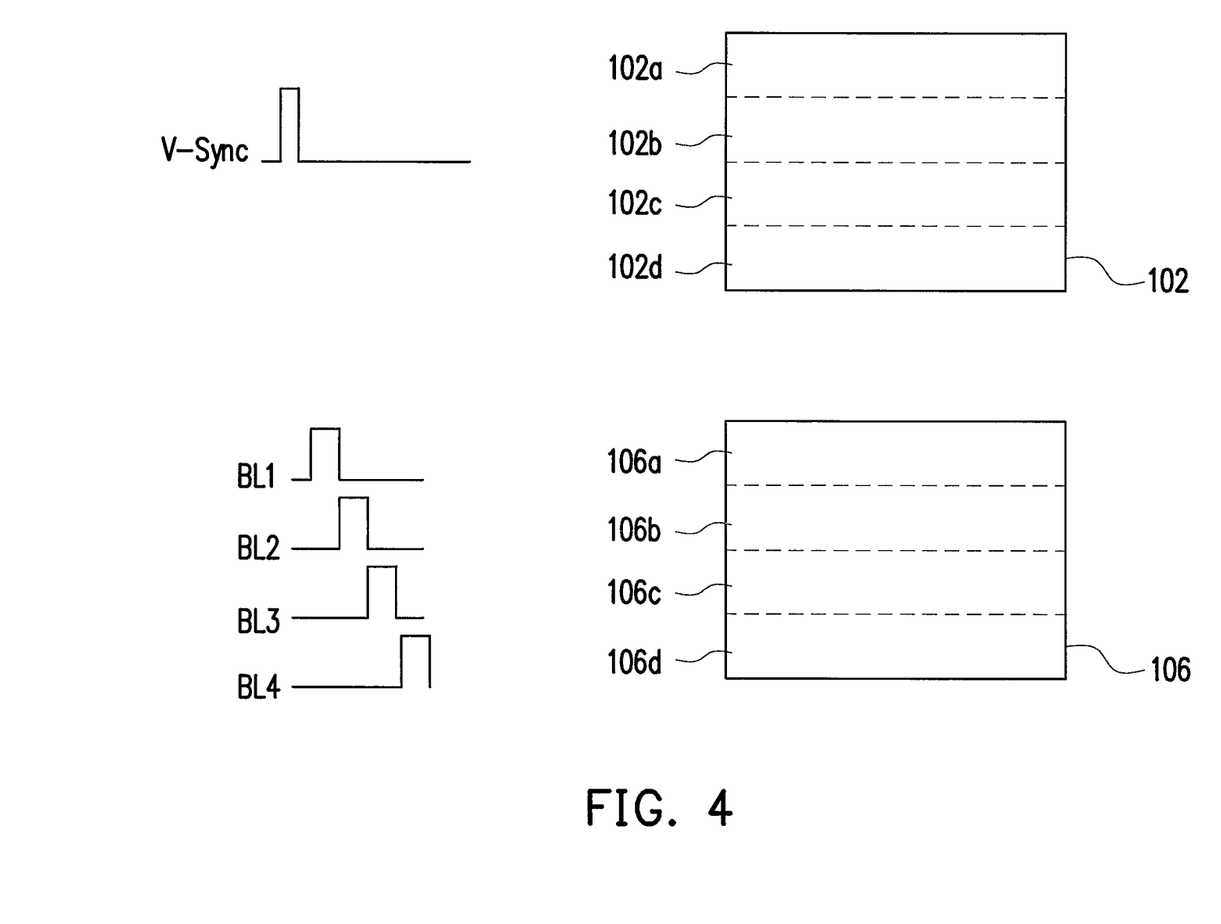
FIG. 4 is a diagram illustrating the driving of a display panel unit and a backlight unit in FIG. 3.

FIG. 3 is a diagram illustrating the driving clock of a stereo display according to an embodiment of the present invention. FIG. 4 is a diagram illustrating the driving of a display panel unit and a backlight unit in FIG. 3. First, referring to FIG. 3, in the present embodiment, a right eye image RF and a left eye image LF are alternatively or sequentially displayed in the display panel unit 102, and each image (the right eye image or the left eye image) is displayed for a time T. The display panel unit 102 generates a synchronizing vertical signal V-Sync during each image time T.

In addition, the clock signal of the right eye glass of the shutter glasses unit is RG, and the clock signal of the left eye glass of the shutter glasses unit is LG. Thus, when the display panel unit displays the right eye image RF, the clock signal RG of the right eye glass of the shutter glasses unit is in an on state, and the clock signal LG of the left eye glass of the shutter glasses unit is in an off state. When the display panel unit displays the left eye image LF, the clock signal LG of the left eye glass of the shutter glasses unit is in an on state, and the clock signal RG of the right eye glass of the shutter glasses unit is in an off state.

As described above, the backlight unit 106 is divided into N light emitting areas according to the N image data areas of the display panel unit 102. In the embodiment illustrated in FIG. 3, the display panel unit is divided into four image data areas, and the backlight unit is also divided into four light emitting areas. However, the present invention is not limited thereto, and in other embodiments, the display panel unit 102 may also be divided into five or more image data areas, and the backlight unit 106 may also be divided into five or more light emitting areas. Referring to FIG. 3 again, since the backlight unit 106 is divided into four light emitting areas, the clock signal BL of the backlight unit includes the clock signal BL1 of the first light emitting area, the clock signal BL2 of the second light emitting area, the clock signal BL3 of the third light emitting area, and the clock signal BL4 of the fourth light emitting area. In particular, the light emitting areas of the backlight unit are turned on in sequence from the first light emitting area through the fourth light emitting area. In other words, the clock signal BL1 of the first light emitting area, the clock signal BL2 of the second light emitting area, the clock signal BL3 of the third light emitting area, and the clock signal BL4 of the fourth light emitting area are sequentially turned on during an image time T, and when one of the light emitting areas is turned on, other light emitting areas are all turned off. Thus, if the N light emitting areas of the backlight unit 106 are turned on within the time T, the turn-on time of each of the light emitting areas is T/N. Taking the embodiment illustrated in FIG. 3 as an example, if each image time T is $1/120$ second, then the turn-on time of each light emitting area is $1/480$ second.

It should be mentioned that the turn-on time of each light emitting area of the backlight unit is also referred to as duty cycle and which is adjustable. The brightness of the stereo display can be adjusted through the adjustment of the duty cycle. For example, if each image time T is $1/120$ second and the turn-on time of each of the four light emitting areas is adjusted to $1/520$ second, the brightness of the stereo display is reduced compared to that the turn-on time of each light emitting area is $1/480$ second.

The relationship between the clock signal of the backlight unit 106 and the clock signal of the display panel unit 102 in the embodiment illustrated in FIG. 3 will be further explained with reference to FIG. 4. Referring to FIG. 4, the display panel unit 102 is divided into a first image data area 102a, a second image data area 102b, a third image data area 102c, and a fourth image data area 102d, and the backlight unit 106 is divided into a first light emitting area 106a, a second light emitting area 106b, a third light emitting area 106c, and a fourth light emitting area 106d. In particular, the light emitting areas 106a~106d are disposed respectively corresponding to the image data areas 102a~102d. When the display panel unit 102 displays an image (a left eye image or a right eye image) according to a synchronizing vertical signal V-Sync, the image is filled up from top to bottom (i.e., from the first image data area 102a to the fourth image data area 102d). Herein the backlight unit 106 first turns on the first light emitting area 106a and then sequentially turns on the second light emitting area 106b, the third light emitting area 106c, and the fourth light emitting area 106d. Ideally, the first light emitting area 106a of the backlight unit 106 is turned on after the first image data area 102a of the display panel unit 102 is completed filled up, the second light emitting area 106b of the backlight unit 106 is turned on after the second image data area 102b of the display panel unit 102 is completely filled up, the third light emitting area 106c of the backlight unit 106 is turned on after the third image data area 102c of the display panel unit 102 is completely filled up, and the fourth light emitting area 106d of the backlight unit 106 is turned on after the fourth image data area 102d of the display panel unit 102 is completely filled up.

Since the first light emitting area 106a of the backlight unit 106 is turned on after the first image data area 102a of the display panel unit 102 is completely filled up, it is ensured that the backlight corresponding to an image data area is turned on after this image data area is completely filled up with image data, so that a viewer can actually see the image data area filled up with image data through his eyes. Accordingly, the viewer can only see the image that should be seen. Since the light emitting areas of the backlight unit 106 corresponding to the image data areas that are not yet filled up with image data or the image data therein is not yet completely updated are not turned on, the viewer will not see images within these areas. In other words, the residual image in the display panel unit 102 is not seen because the backlight unit 106 is turned off. Besides, in the present embodiment, since the light emitting areas are sequentially turned on from top to bottom, dynamic images are made more clear and smooth, just like the effect of the black frame insertion technique.

Second Embodiment

Figure 5:
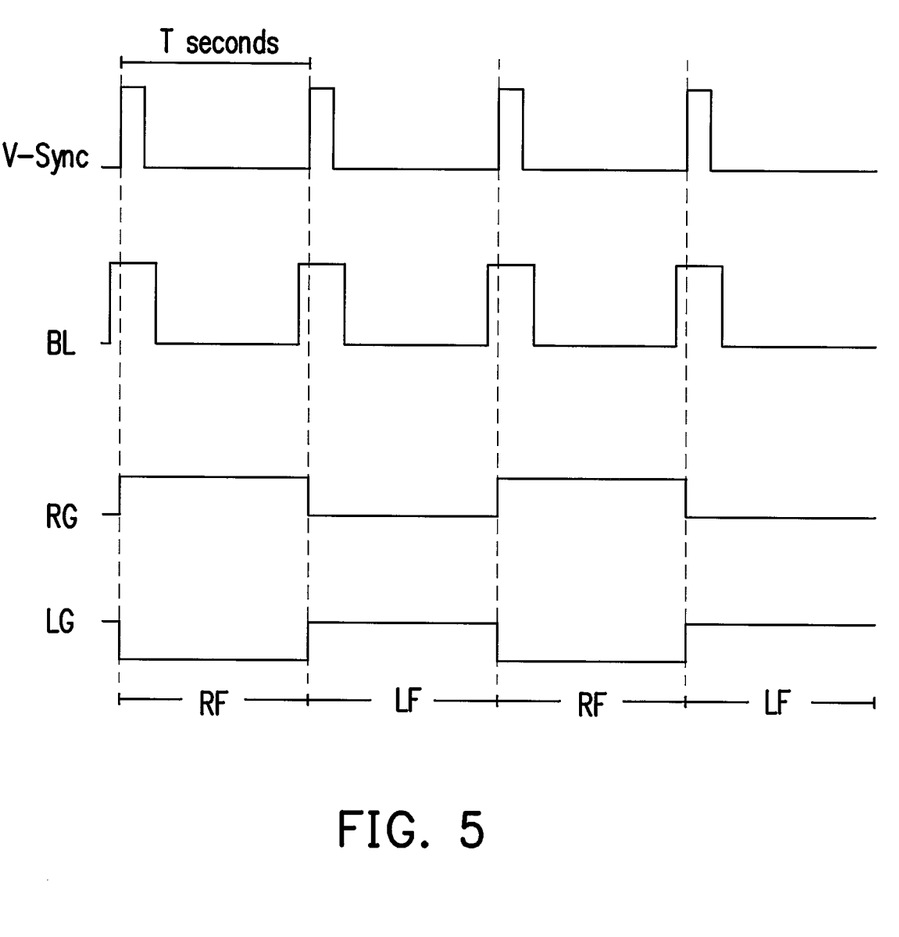
FIG. 5 is a diagram illustrating the driving clock of a stereo display according to another embodiment of the present invention.

FIG. 5 is a diagram illustrating the driving clock of a stereo display according to another embodiment of the present invention. Referring to FIG. 5, in the present embodiment, the clock signals RG and LG for controlling the display panel unit 102 to display images according to the synchronizing vertical signal V-Sync and the shutter glasses unit 104 to be turned on and off according to the synchronizing vertical signal V-Sync are the same as those in the embodiment illustrated in FIG. 3 therefore will not be described herein. The difference between the present embodiment and the embodiment in FIG. 3 falls on the clock signal BL of the backlight unit. In the present embodiment, the light emitting areas of the backlight unit 106 are turned on simultaneously instead of sequentially. Namely, all the light emitting areas (the N light emitting areas) of the backlight unit 106 are turned on at the same time, and all the light emitting areas (the N light emitting areas) of the backlight unit 106 are turned off at the same time. In particular, the turn-on time for simultaneously turning on the N light emitting areas is smaller than the display time of an image (a right eye image or a left eye image). For example, if the display time of an image (the right eye image or the left eye image) is T second (for example, $1/120$ second), the turn-on time of the backlight unit may be $1/625$ second during this image display time. Ideally, all the light emitting areas (the N light emitting areas) of the backlight unit 106 are turned on after all the image data areas (the N image data areas) of the image (the right eye image or the left eye image) displayed by the display panel unit 102 are completely filled up.

It should be mentioned that the turn-on time of each light emitting area of the backlight unit 106 is also referred to as duty cycle and which is adjustable. The brightness of a stereo display can be adjusted through the adjustment of the duty cycle.

In the present embodiment, since all the light emitting areas (the N light emitting areas) of the backlight unit 106 are turned on after all the image data areas (the N image data areas) of the display panel unit 102 are completely filled up, it is ensured that the backlight unit 106 is only turned on after the image data areas are actually filled up. Accordingly, the viewer can only see the image that should be seen. Since the backlight unit 106 is not turned on when the image data areas are not yet filled up with image data or the image data therein is not yet completely updated, the viewer will not see any residual image. In other words, the residual image in the display panel unit 102 is not seen because the backlight unit 106 is turned off.

Figure 6:
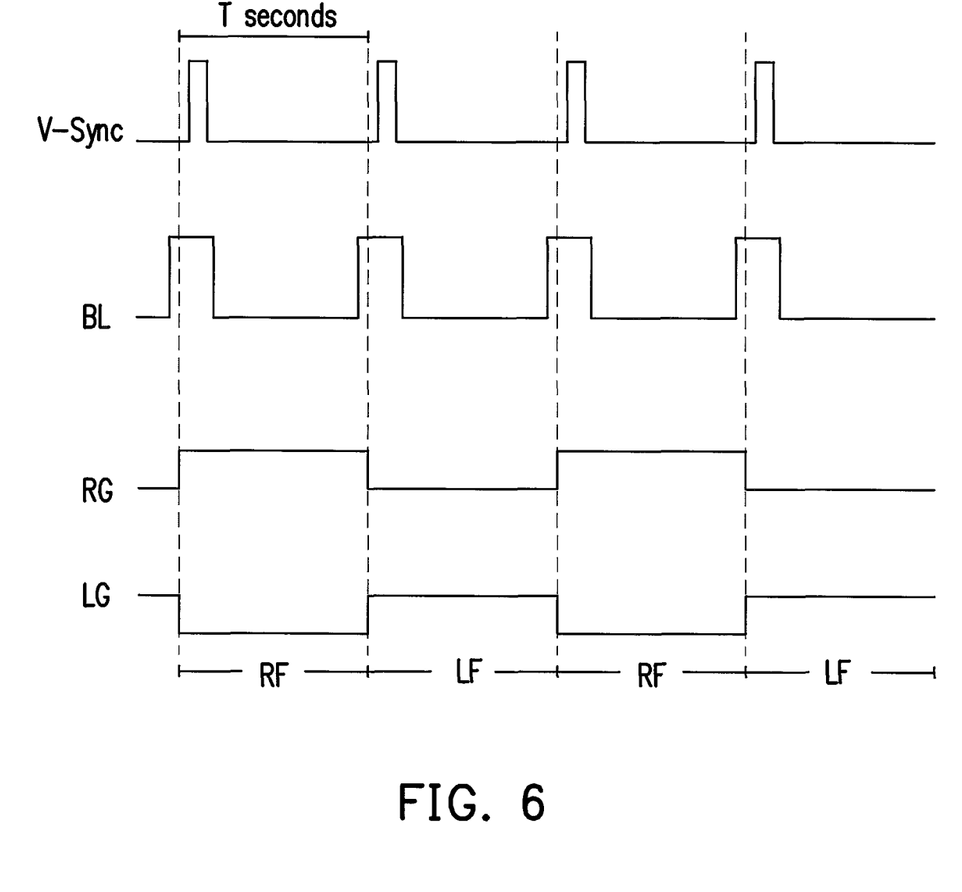
FIG. 6 is a diagram illustrating the driving clock of a stereo display according to yet another embodiment of the present invention.

FIG. 6 is a diagram illustrating the driving clock of a stereo display according to yet another embodiment of the present invention. The embodiment illustrated in FIG. 6 is similar to the embodiment illustrated in FIG. 5, and the only difference between the two falls on the clock signal BL of the backlight unit 106. In the present embodiment, all the light emitting areas (the N light emitting areas) of the backlight unit are also simultaneously turned on and simultaneously turned off. Since all the light emitting areas (the N light emitting areas) of the backlight unit are only turned on after all the image data areas (the N image data areas) of the display panel unit 102 are completely filled up, the problem of low brightness of the stereo display may be caused due to the short turn-on time of the backlight unit 106. In the present embodiment, the clock signal BL of the backlight unit 106 is turned on from the last part of the display time of a previous image, so as to prolong the turn-on time of the backlight unit 106 and accordingly increase the brightness of the entire stereo display.

In the embodiment illustrated in FIG. 6, because the backlight unit 106 is turned on in advance at the last part of the display time of the previous image, residual images may be observed within a small area at the top of the display panel unit 102 and a small area at the bottom of the display panel unit 102 during this short time. However, because no residual image exists within the large middle portion of the display panel unit 102 due to the on/off of the backlight unit, the stereo display in the present embodiment can still greatly reduce the discomfort brought to a viewer compared to a conventional stereo display.

Third Embodiment

Figure 7:
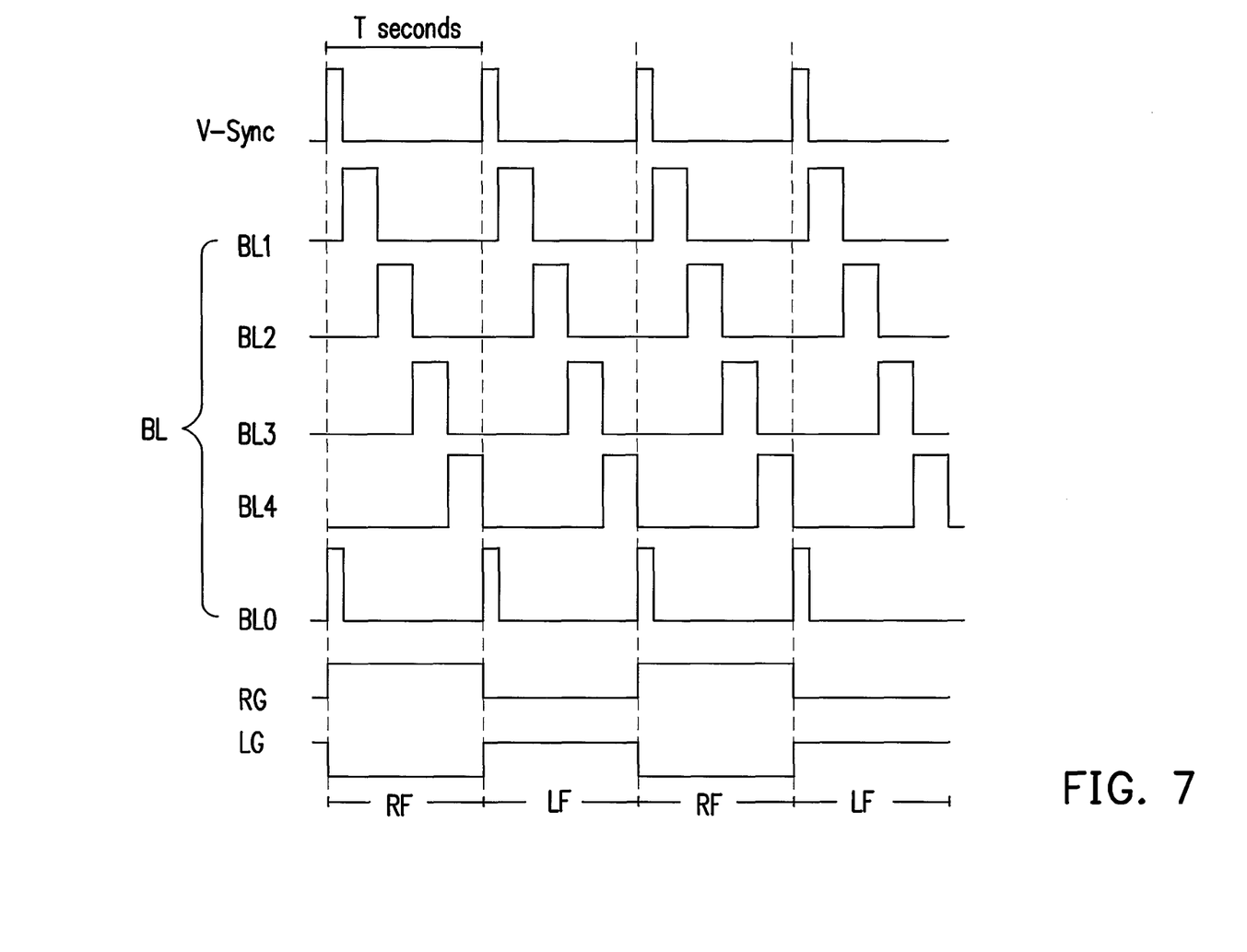
FIG. 7 is a diagram illustrating the driving clock of a stereo display according to still another embodiment of the present invention.

FIG. 7 is a diagram illustrating the driving clock of a stereo display according to still another embodiment of the present invention. Referring to FIG. 7, in the present embodiment, the clock signals RG and LG for controlling the display panel unit to display images according to the synchronizing vertical signal V-Sync and the shutter glasses unit to be turned on and off according to the synchronizing vertical signal V-Sync are the same as those in the embodiment illustrated in FIG. 3 therefore will not be described herein. The difference between the present embodiment and the embodiment in FIG. 3 is that in the present embodiment, the clock signal BL of the backlight unit 106 further includes an additional backlight clock signal BL0 besides the clock signal BL1 of the first light emitting area, the clock signal BL2 of the second light emitting area, the clock signal BL3 of the third light emitting area, and the clock signal BL4 of the fourth light emitting area. In other words, the clock signal BL of the backlight unit 106 in the present embodiment is the combination of the clock signal of the backlight unit 106 in the first embodiment and the clock signal of the backlight unit in the second embodiment.

Similarly, the light emitting areas of the backlight unit 106 are sequentially turned on from the first light emitting area through the fourth light emitting area. In other words, the clock signal BL1 of the first light emitting area, the clock signal BL2 of the second light emitting area, the clock signal BL3 of the third light emitting area, and the clock signal BL4 of the fourth light emitting area are sequentially turned on during an image time T, and when one of the light emitting areas is in the on state, other light emitting areas are all in the off state. In other words, the clock signal BL1 of the first light emitting area, the clock signal BL2 of the second light emitting area, the clock signal BL3 of the third light emitting area, and the clock signal BL4 of the fourth light emitting area are sequentially turned on during an image time T, and when one of the light emitting areas is in the on state, other light emitting areas are all in the off state. Thus, if the backlight unit turns on the N light emitting areas within an image time T, the turn-on time of each of the light emitting areas is T/N. Taking the embodiment illustrated in FIG. 3 as an example, if each image time T is $1/120$ second, the turn-on time of each light emitting area is $1/480$ second. The first half of the turn-on time of the additional backlight clock signal BL0 is right after the clock signal BL4 of the fourth light emitting area, and the second half of the turn-on time of the additional backlight clock signal BL0 is right after the clock signal BL1 of the first light emitting area. Ideally, the time of the additional backlight clock signal BL0 is equivalent to the clock signal system time of the synchronizing vertical signal.

Similarly, the turn-on time of each light emitting area of the backlight unit and the turn-on time of the additional backlight are also referred to as duty cycle and which are adjustable. The brightness of the stereo display can be adjusted through the adjustment of the duty cycle.

In the present embodiment, the clock signal BL of the backlight unit further includes an additional backlight clock signal besides the clock signals of the backlight unit in the first embodiment. Accordingly, in the present embodiment, besides that the viewer can only see the image that should be seen, since the light emitting areas of the backlight unit corresponding to those image data areas that are not yet completely filled up with image data or image data therein is not yet completely updated are not turned on, the viewer cannot see images in these image data areas. Thereby, the viewer will not feel any discomfort while looking at an image. In addition, an additional backlight clock signal is further adopted in the present embodiment such that the brightness of the entire stereo display is increased.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A stereo display, comprising:
a display panel unit, for sequentially displaying a right eye image and a left eye image according to a right eye synchronizing vertical signal and a left eye synchronizing vertical signal;
a shutter glasses unit, having a right eye glass and a left eye glass, wherein the right eye glass is synchronously opened according to the right eye synchronizing vertical signal, and the left eye glass is synchronously opened according to the left eye synchronizing vertical signal;

a backlight unit, for providing a light source to the display panel unit, wherein the backlight unit is synchronously turned on and off according to the right eye synchronizing vertical signal and is synchronously turned on and off according to the left eye synchronizing vertical signal; and a control unit electrically connected to the display panel unit, the shutter glasses unit, and the backlight unit, wherein the control unit divides the display panel unit into N image data areas and divides the backlight unit into N light emitting areas, and N>1, wherein when a 3D image is displayed, the backlight unit sequentially turns on the first light emitting area through the Nth light emitting area, the backlight unit further simultaneously turns on the N light emitting areas of the backlight unit during a specific period for turning on the first light emitting area through the Nth light emitting area.

2. The stereo display according to claim 1, wherein the backlight unit turns on the N light emitting areas within a time T, and a turn-on time of each of the light emitting areas is T/N.

3. The stereo display according to claim 1, wherein when the display panel unit displays the right eye image or the left eye image, the display panel unit is gradually filled up the right eye image or the left eye image from the first image data area through the Nth image data area, and the first light emitting area of the backlight unit is turned on after the first image data area is filled up.

4. The stereo display according to claim 1, wherein the turn-on time of each of the light emitting areas of the backlight unit is adjustable.

5. A stereo display, comprising:

a display panel unit, for sequentially displaying a right eye image and a left eye image according to a right eye synchronizing vertical signal and a left eye synchronizing vertical signal;

a shutter glasses unit, having a right eye glass and a left eye glass, wherein the right eye glass is synchronously opened according to the right eye synchronizing vertical signal, and the left eye glass is synchronously opened according to the left eye synchronizing vertical signal;

a backlight unit, for providing a light source to the display panel unit, wherein the backlight unit is synchronously turned on and off according to the right eye synchronizing vertical signal and is synchronously turned on and off according to the left eye synchronizing vertical signal; and a control unit electrically connected to the display panel unit, the shutter glasses unit, and the backlight unit, wherein the control unit divides the display panel unit into N image data areas and divides the backlight unit into N light emitting areas, and N>1, wherein when a 3D image is displayed, the backlight unit turns on the N light emitting areas simultaneously, the turn-on time of the N light emitting areas is smaller than a display time of one right eye image or one left eye image, and the N light emitting areas are turned off simultaneously after the turn-on time in the display time of one right eye image or one left eye image.

6. The stereo display according to claim 5, wherein the turn-on time of the N light emitting areas is smaller than a display time of one right eye image or one left eye image.

7. The stereo display according to claim 5, wherein the N light emitting areas are turned on when the right eye image or the left eye image completely fills up the N image data areas.

8. A display, comprising:

a display panel unit, for displaying an image according to a synchronizing vertical signal;

a backlight unit, for providing a light source to the display panel unit, wherein the backlight unit is turned on and off according to the synchronizing vertical signal; and a control unit electrically connected to the display panel unit and the backlight unit, wherein the control unit divides the display panel unit into N image data areas and divides the backlight unit into N light emitting areas, and N>1, wherein when a 3D image is displayed, the backlight unit sequentially turns on the first light emitting area through the Nth light emitting area, the backlight unit further simultaneously turns on the N light emitting areas of the backlight unit during a specific period for turning on the first light emitting area through the Nth light emitting area.

9. The display according to claim 8, wherein the backlight unit turns on the N light emitting areas within a time T, and a turn-on time of each of the light emitting areas is T/N.

10. The display according to claim 8, wherein when the display panel unit displays the image, the display panel unit is gradually filled up the image from the first image data area through the Nth image data area, and the first light emitting area of the backlight unit is turned on after the first image data area is completely filled up.

11. The display according to claim 8, wherein the turn-on time of each of the light emitting areas of the backlight unit is adjustable.

12. A stereo display, comprising:

a display panel unit, for displaying an image according to a synchronizing vertical signal;

a backlight unit, for providing a light source to the display panel unit, wherein the backlight unit is turned on and off according to the synchronizing vertical signal; and a control unit electrically connected to the display panel unit and the backlight unit, wherein the control unit divides the display panel unit into N image data areas and divides the backlight unit into N light emitting areas, and N>1, wherein when a 3D image is displayed, the backlight unit turns on the N light emitting areas simultaneously, the turn-on time of the N light emitting areas is smaller than a display time of one right eye image or one left eye image, and the N light emitting areas are turned off simultaneously after the turn-on time in the display time of one right eye image or one left eye image.

13. The display according to claim 12, wherein the turn-on time of the N light emitting areas is smaller than a display time of an image.

14. The display according to claim 12, wherein the backlight unit only turns on the N light emitting areas when the image completely fills up the N image data areas.

* * * * *